(12) United States Patent
Glinsky (10) Patent No.: US 10,172,323 B2
(45) Date of Patent: Jan. 8, 2019

(54) ANIMAL FEEDING DISH TO CONTROL RATE OF FOOD CONSUMPTION

(71) Applicant: Jason Glinsky, New Smyrna Beach, FL (US)

(72) Inventor: Jason Glinsky, New Smyrna Beach, FL (US)

(73) Assignee: LUNALEX, INC., New Smyrna Beach, FL (US)

( * ) Notice: Subject to any disclaimer, the term of this patent is extended or adjusted under 35 U.S.C. 154(b) by 147 days.

(21) Appl. No.: 15/336,148

(22) Filed: Oct. 27, 2016

(65) Prior Publication Data

US 2017/0112093 A1    Apr. 27, 2017

Related U.S. Application Data

(60) Provisional application No. 62/246,680, filed on Oct. 27, 2015.

(51) Int. Cl.
| | | |
|---|---|---|
| A01K 7/00 | (2006.01) | |
| A01K 5/01 | (2006.01) | |
| A01K 5/02 | (2006.01) | |

(52) U.S. Cl.
CPC .......... *A01K 5/0291* (2013.01); *A01K 5/0114* (2013.01); *A01K 5/0275* (2013.01)

(58) Field of Classification Search
CPC .. A01K 5/0291; A01K 5/0114; A01K 5/0135; A01K 7/005
USPC .............................. 119/61.54; D30/121, 129
See application file for complete search history.

(56) References Cited

U.S. PATENT DOCUMENTS

| | | | | |
|---|---|---|---|---|
| D92,874 | S | * | 7/1934 | Baltzley ................... D21/340 |
| 3,491,724 | A | | 1/1970 | Sunner |
| 3,731,658 | A | * | 5/1973 | Livermore ........... A01K 5/0121 |
| | | | | 119/61.54 |
| 4,442,969 | A | | 4/1984 | Holden |
| 5,297,504 | A | * | 3/1994 | Carrico ................. A01K 7/005 |
| | | | | 119/61.54 |
| 5,564,363 | A | * | 10/1996 | Soffici ................. A01K 5/0142 |
| | | | | 119/61.53 |
| 7,207,291 | B1 | * | 4/2007 | Watts ................... A01K 5/0114 |
| | | | | 119/61.5 |
| 7,895,975 | B2 | | 3/2011 | Markham |
| 8,534,225 | B2 | | 9/2013 | Vermeegen |
| D699,009 | S | * | 2/2014 | Hansen ....................... D30/121 |
| 8,651,055 | B2 | | 2/2014 | Dreger et al. |
| D705,999 | S | * | 5/2014 | Hansen ....................... D30/121 |
| D706,000 | S | * | 5/2014 | Martinez ..................... D30/121 |
| D706,001 | S | * | 5/2014 | Hansen ....................... D30/121 |

(Continued)

FOREIGN PATENT DOCUMENTS

| | | |
|---|---|---|
| WO | 2007133248 | 11/2007 |
| WO | 2008041952 | 4/2008 |
| WO | 2009029999 | 3/2009 |

*Primary Examiner* — Monica L Williams
(74) *Attorney, Agent, or Firm* — Gearhart Law LLC (57) ABSTRACT

A feeding dish for an animal to assist in controlling the rate of consumption of a food item may have a series of protrusions in the form of undulating rings or walls. These rings limit animal access to the food based on the configurations and arrangement of the protrusions. The feeding dishes encourage an animal to exert a more calculated effort to retrieve and eat the food item thereby alleviating potential deadly conditions, such as gastric dilatation-volvulus or aspiration, from afflicting the animal.

10 Claims, 8 Drawing Sheets

(56) References Cited

U.S. PATENT DOCUMENTS

| | | | |
|---|---|---|---|
| D706,494 S * | 6/2014 | Hansen | D30/121 |
| D706,495 S * | 6/2014 | Hansen | D30/121 |
| 8,844,466 B2 | 9/2014 | Vermeegen | |
| 8,899,180 B2 | 12/2014 | Lindskov et al. | |
| D739,615 S * | 9/2015 | Robertson | D30/129 |
| D769,546 S * | 10/2016 | Hansen | D30/121 |
| 2002/0185073 A1 | 12/2002 | Fullerton et al. | |
| 2006/0005774 A1 | 1/2006 | Newman Bornhofen | |
| 2006/0060149 A1* | 3/2006 | Skowronski | A01K 5/0135 119/61.55 |
| 2006/0213447 A1 | 9/2006 | Kitchen et al. | |
| 2009/0126641 A1 | 5/2009 | Anderson et al. | |
| 2013/0125823 A1 | 5/2013 | Simon et al. | |
| 2014/0060442 A1 | 3/2014 | Ressemann et al. | |
| 2014/0165920 A1* | 6/2014 | Sarty | A01K 7/005 119/72 |

* cited by examiner

ANIMAL FEEDING DISH TO CONTROL RATE OF FOOD CONSUMPTION

CLAIM OF PRIORITY

This application claims priority to U.S. Application 62/246,680 filed on Oct. 27, 2015, the contents of which are herein fully incorporated by reference in its entirety.

FIELD OF THE EMBODIMENTS

The field of the embodiments of the present invention relate to feeding dishes for animals to assist in controlling the rate of consumption of a food item. The feeding dishes have protrusions that encourage an animal to exert a more calculated effort to retrieve and eat the food item thereby alleviating potential deadly conditions from afflicting the animal.

BACKGROUND OF THE EMBODIMENTS

Various wild and domesticated animals have feeding behaviors characterized by the swallowing of large amounts or hunks of food rapidly within a short time frame. Some of this behavior may be attributed to instinct, while some of the behavior may be attributed to the particular species, such as the domesticated dog, and the environment in which the animal is fed. Additionally, a domesticated dog or dog that rapidly consumes large amounts of food may be a function of how the dog is fed.

However, problems can arise if food is consumed in such a manner. One problem associated with animals who swallow large amounts of food is the increase in risk that an animal may aspirate on some portion of the food. Aspirating a particularly large chunk of food may completely block the animal's airway, or may cause the animal to uncontrollably cough causing damage to the animal's heart and lungs. In some instances, aspiration can lead to death.

Another medical issue associated with rapid consumption of food, particularly in dogs, is gastric dilatation-volvulus (GDV) which is also known as "bloat," "stomach torsion," or "twisted stomach." GDV is an extremely serious condition comprising two parts or phases. The gastric dilatation is one part of the condition and the volvulus or torsion is the second part. In dilatation, due to differing reasons, including swallowing of air, the stomach fills up with air which puts pressure on the surrounding internal organs. The air-filled stomach also compresses large veins in the abdomen, thus preventing blood from returning to the heart. Once filled with air, the stomach can easily rotate on itself, thus pinching off its blood supply. This rotation, or volvulus, causes the stomach to begin to die and the animal's entire blood supply becomes disrupted. Once volvulus occurs, an animal's condition often begins to deteriorate very rapidly, and quite frequently results in death.

In order to prevent such medical events from occurring, it is desirable to reduce the rate at which food is consumed. For some breeds of dogs and other animals, the problem of rapid consumption of food is compounded because the animal, by instinct, may swallow large amounts of food during the course of an ordinary meal. As a result, there are very few training techniques that are available to successfully prevent an animal from acting out on this feeding instinct. There have been some attempts to solve such issues, however, they have been met with tepid results, can be time consuming, and in some instances are not practical given a particular home environment. Thus, there is a need for an apparatus that can serve to adequately regulate or limit the rate at which an animal may consume a food item. The present invention and its embodiments meets and exceeds these objectives.

Review of Related Technology

U.S. Pat. No. 8,534,225 pertains to a pet feeding systems for slowing the eating process of a pet, such as a dog, and simultaneously entertaining the pet. The pet feeding system includes a floor, retaining walls, and obstacles which form a food maze. The obstacles may vary, for example, in shape, form, size, height, etc. In addition, the obstacles may include structures to further slow a pets eating, such as tunnels, slides, ramps, etc. The pet feeding system may be fabricated of any appropriate material, including, but not limited to, silicone rubber, natural rubber, metal, and ceramic.

U.S. Pat. No. 7,895,975 pertains to a pet food bowl having with an integral protrusion that helps to prevent inadvertent aspiration of food by the animal. Particularly for dogs, some feeding behaviors are characterized by swallowing large amounts of food. The protrusion in the bowl separates the food into a peripheral channel within the bowl, and the dog therefore cannot simultaneously secure large amounts of food into its mouth. The protrusion is centrally oriented and extends from the base of the bowl, thereby causing the food to be uniformly distributed within the channel.

U.S. Pat. No. 7,207,291 pertains to a pet feeding dish for causing pets to eat their mealtime ration at a slower pace. The pet feeding dish generally comprises an annular-shaped trough which compels the pet to move its snout in a circular fashion therethrough, thereby slowing the eating process. Additionally, obstructions in the form of wave-like indentations are formed in the base of the dish to provide for even distribution of food within the dish as well as to cause the pet to reach into each of the furrows created thereby, thus further retarding the eating process. The teachings of the present invention may be adapted for use with virtually any type of pet that is capable of consuming food from a dish structure such as dogs, cats, rabbits, hamsters, gerbils, or other similar type domesticated or non-domesticated animal.

Various systems and methodologies are known in the art. However, their structure and means of operation are substantially different from the present disclosure. The other inventions fail to solve all the problems taught by the present disclosure. At least one embodiment of this invention is presented in the drawings below and will be described in more detail herein.

SUMMARY OF THE EMBODIMENTS

Generally, the present invention and its embodiments provide for an animal feeding dish that serves to limit or reduce the rate at which an animal may consume a food item presented in the feeding dish. This is achieved by various mechanisms described in more detail herein. In some instances, the present invention provides a feeding dish having strategically positioned concentric or irregularly spaced rings forming small troughs or pockets. The animal, when eating, must maneuver the food item through the troughs or pockets in order to be able to consume the food item. This maneuvering slows the rate of consumption by causing the animal to eat in a more even manner. For example, a dog may be able to only eat dry food or "kibbles" one or two at a time rather than taking large mouthfuls at once.

In other instances, it is contemplated that the animal feeding dish will present the animal with the food item over a period of time rather than all at once, as with traditional plain feeding bowls. Such a feeding dish may have a food loading or food storage area where food is prepared for the animal. A timing mechanism can then be activated to cause the food to be delivered at a measured rate. The timing mechanism may cause the food to travel from the food loading area to a feeding area of the animal feeding dish. This allows the animal to consume the food as it is delivered at a measured rate rather than providing the entire food lot at once.

In one embodiment of the present invention there is an animal feeding dish having a base; an annular sidewall extending upwards from and coupled to the base; at least two interior walls, wherein the at least two interior walls comprise an undulating vertical surface, wherein peaks formed by the undulating vertical surface of one of the at least two interior walls substantially align with valleys of another of the at least two interior walls; and wherein the annular sidewall and at least two interior walls increase in height along a radius of the animal feeding dish.

In another embodiment of the present invention there is an animal feeding dish having a base; an annular sidewall extending upwards from and coupled to the base; two interior walls, wherein the two interior walls comprise an undulating vertical surface, wherein peaks formed by the undulating vertical surface of one of the two interior walls substantially align with valleys of another of the two interior walls; a central post member positioned in a central area of the animal feeding dish; and wherein the annular sidewall has a height less than that of the two interior walls and one of the two interior walls has a height that is less than the other interior wall.

In yet another embodiment of the present invention there is an animal feeding dish having a base; an annular sidewall extending upwards from and coupled to the base; a central protrusion extending upwardly from the base, wherein a height of the central protrusion is greater than that of the annular sidewall; a timing mechanism; and a food delivery mechanism coupled to the timing mechanism.

In still another embodiment of the present invention there is an animal feeding dish having a base; an annular sidewall extending upwards from and coupled to the base forming a bowl; a central protrusion having a shaft member and a top section, the central protrusion extending upwardly from the base and having channels disposed on an outer surface, wherein the central protrusion has at least one opening in the top section configured to allow a food item to travel from within the central opening to the bowl; a spring loaded timing mechanism; and a food delivery mechanism coupled to the timing mechanism.

In still another embodiment of the present invention there is an animal feeding dish having a base; an annular sidewall extending upwards from and coupled to the base; two interior walls, wherein the two interior walls are coupled via a plurality of separating bars forming pockets therebetween; a central post member positioned in a central area of the animal feeding dish; and wherein the annular sidewall has a height less than that of the two interior walls and one of the two interior walls has a height that is less than the other interior wall.

In general, the present invention succeeds in conferring the following, and others not mentioned, benefits and objectives.

It is an object of the present invention to provide an animal feeding dish that slows an animal during the eating process.

It is an object of the present invention to provide an animal feeding dish that entertains an animal in its pursuit of food.

It is an object of the present invention to provide an animal feeding dish that can provide food at a predetermined rate.

It is an object of the present invention to provide an animal feeding dish that is lightweight and portable.

It is an object of the present invention to provide an animal feeding dish that can be used for both food and water.

It is an object of the present invention to provide an animal feeding dish that helps to limit or prevent gastric dilatation-volvulus in dogs and other animals.

It is an object of the present invention to provide an animal feeding dish that safe for use in homes and around children.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Throughout this disclosure, the term "pet" or "animal" may include any generally non-human animal which is owned or otherwise cared for, at least in part, by a human for the purposes of amusement, entertainment, husbandry, rehabilitation, companionship or the like, wherein several examples of these types of pets may include mammals, birds, reptiles, amphibians, fish, and invertebrates, and may specifically include but are not limited to dogs, cats, hamsters, cattle, horses, or a combination thereof. Additionally, it is contemplated that the teachings of embodiments of the present invention may also be adapted for use with many types of wild or exotic animals that are held in captivity such as may be found in a typical zoo.

Figure 1:
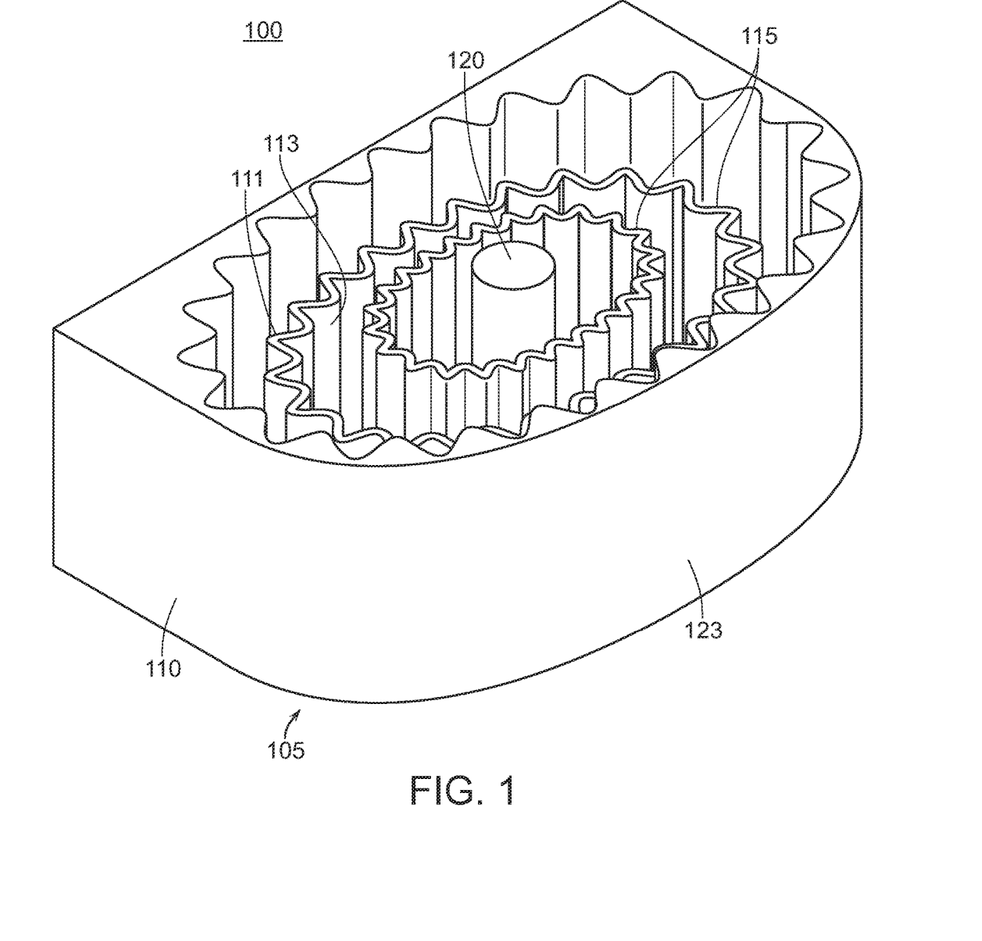
FIG. 1 is a perspective view of a first embodiment of an animal feeding dish.

Referring now to FIG. 1, there is an embodiment of the present invention. The bowl 100 generally comprises a base 105 having an annular sidewall 110. The bowl 100 may take a variety of shapes and forms including circular, oval, quadrilateral, irregularly or non-polygonal shaped, etc. The annular sidewall 110 may have the same shape or a different shape as the remainder of the bowl 100. As shown, the annular sidewall 110 may have at least one flat edge whereas the inner components/walls of the bowl 100 are substantially oval.

The annular sidewall 110 has at least an inner surface and an outer surface. Within the confines of the annular sidewall 110 there is at least one and preferably at least two interior walls 115. The interior walls 115 both may have at least inner surfaces 113 and outer surfaces 111 that are undulated or otherwise irregularly shaped. The relationship between these undulations will be further described herein below. The interior walls 115 may be concentric in nature or may be irregular in their relationship to one another.

In a central portion of the bowl 100, there may be a central post member 120. The central post member 120 may be the tallest feature of the bowl 100. In other embodiments, the central post member 120 is the taller than the interior walls 115 but shorter than the annular sidewall 110. In other embodiments, the central post member 120 is at a height that is less than or equal to the highest of the annular sidewall 110 or the interior walls 115. The arrangement of the varying heights of the walls, both interior and sidewall, along with the central post member 120 is one mechanism employed by embodiments of the present invention to slow or prevent an animal from consuming food too rapidly, as the animal must shift its attention between varying heights thereby changing directions while eating as a result.

Further, the bowl 100 may be wholly or partially coated in an antimicrobial coating 123. The coating may further be water proof or water resistant to prevent damage to the bowl 100 from saliva or water depending on the composition of the bowl 100.

Figure 2:
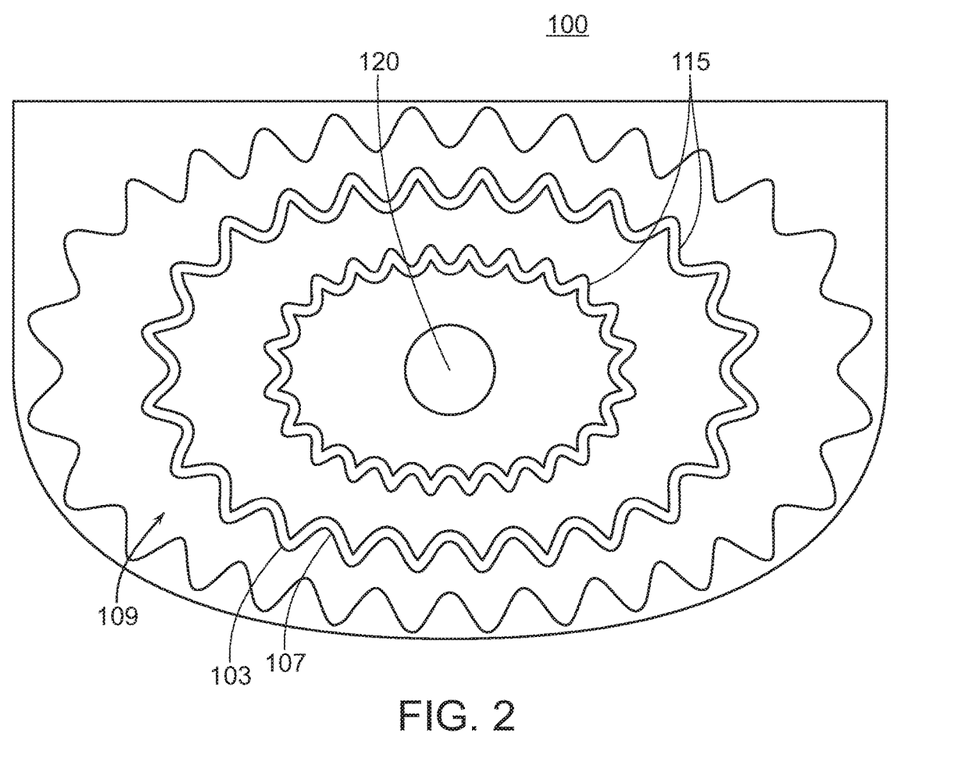
FIG. 2 is a top view of a first embodiment of an animal feeding dish.

As shown in FIG. 2, the bowl 100 has two interior walls 115 concentrically or irregularly positioned with a central post member 120 located within the inner of the two interior walls 115. The central post member 120 may be located in different or multiple positions within the bowl 100. Further, the interior walls 115 may comprise undulating surfaces. These undulating surfaces form peaks 103 and valleys 107 along the length of the interior walls 115. The interior walls 115, as well as the interior surface of the annular sidewall 110, are positioned such that the peaks 103 of one wall align with valleys 107 of the other wall. This forms pockets 109 whereby food items may reside.

Figure 3:
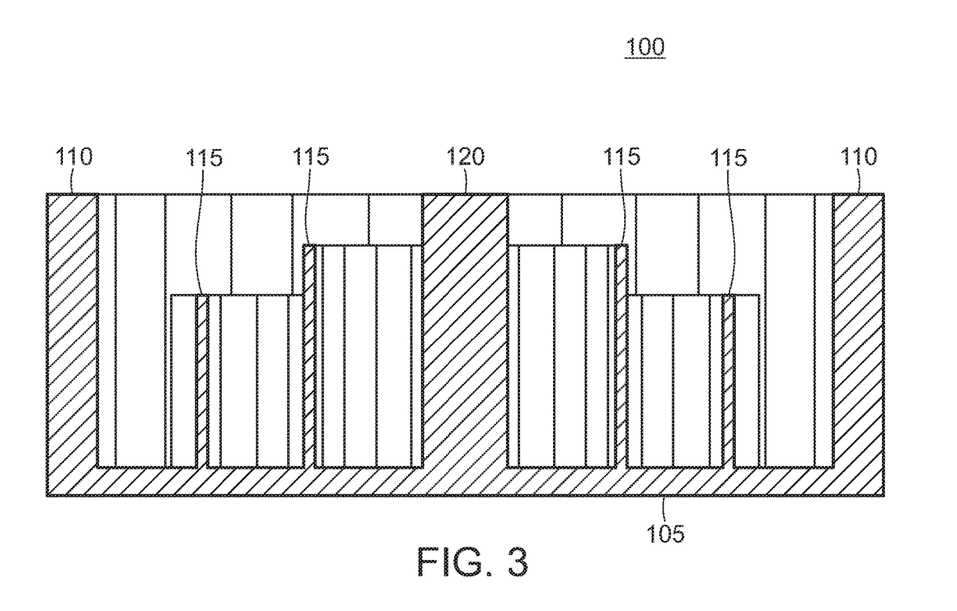
FIG. 3 is a sectional side view of a first embodiment of an animal feeding dish.

Referring now to FIG. 3, the sectional side view of the embodiment demonstrates the height relationships between the structures of the bowl 100. Here, the annular sidewall 110 is higher than both of the two interior walls 115 with the shorter of the walls being the one closest to the annular sidewall 110. The central post member 120 may be the tallest or highest structure in the bowl 100, however, the central post member 120 may be no higher than the annular sidewall 110 as shown. In other embodiments, the annular sidewall 110 is shorter than the two interior walls 115 which are in turn shorter than the central post member 120. There may be any number of configurations of feature height and are not limited to simply those described herein. The bottom inner surface or space between the annular sidewall 110 and interior walls 115 may also be undulating or irregularly shaped in addition to be flat.

Figure 4:
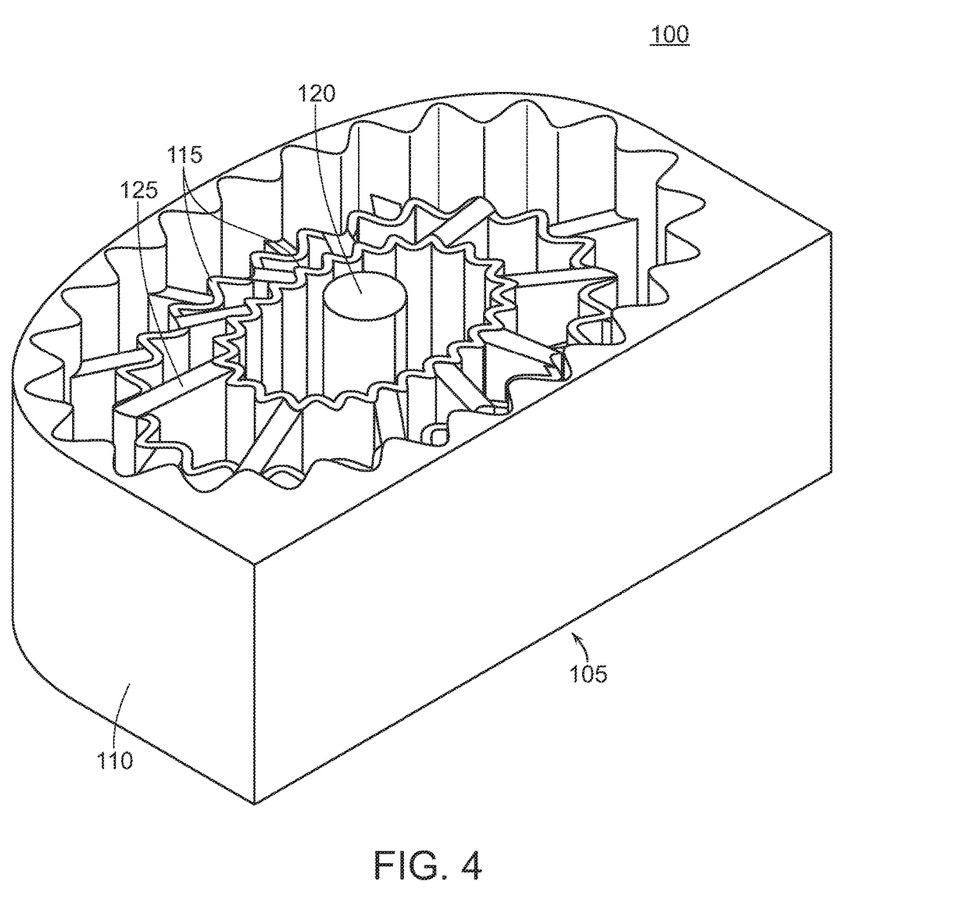
FIG. 4 is a perspective view of a second embodiment of an animal feeding dish.

Referring now to FIG. 4, there is a second embodiment of the present invention. The bowl 100 generally comprises a base 105 having an annular sidewall 110. The bowl 100 may take a variety of shapes and forms including circular, oval, quadrilateral, etc. The annular sidewall 110 may have the same or a different shape as the remainder of the bowl 100. As shown, the annular sidewall 110 has at least one flat edge whereas the inner components of the bowl 100 are substantially oval. The flat edge allows the bowl 100 to be positioned along a wall or other substantially flat surface thereby preventing or limiting movement of the bowl 100 when in use. The bowl 100 may or may not have an antimicrobial or other coating as previously described herein.

The annular sidewall 110 has at least an inner surface and an outer surface. Within the annular sidewall 110 there is at least one and preferably at least two interior walls 115. The interior walls 115 both may have at least inner surfaces 113 and outer surfaces 111 that are undulated or otherwise irregularly or regularly shaped. Further, these interior walls 115 are coupled via separating bars 125 which serve to further create pockets 109 (see FIG. 5) and diversions for the animal to have to maneuver around in order to access the food. The separating bars 125 may, in some embodiments, be removable and/or repositionable. Further, the separating bars may be further positioned between the inner surface of the annular sidewall 110 and the outermost of the interior walls 115 as shown.

In a central portion of the bowl 100, there may be a central post member 120. The central post member 120 may be the tallest feature of the bowl 100. In other embodiments, the central post member 120 is the taller than the interior walls 115 but shorter than the annular sidewall 110. In other embodiments, the features are of the same heights. Yet, in other embodiments, other height configurations of the features may exist.

Figure 5:
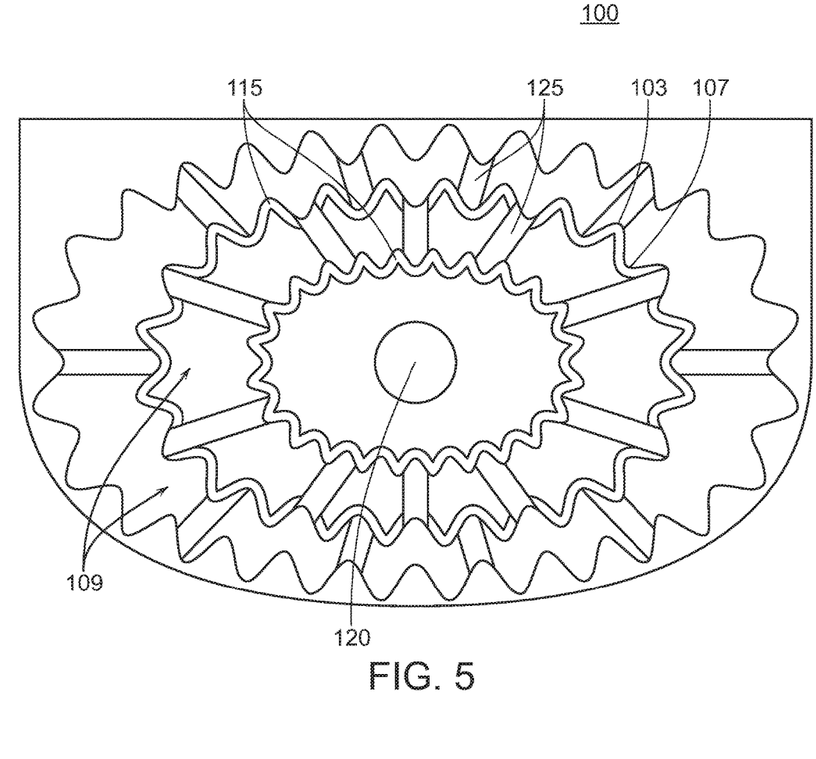
FIG. 5 is a top view of a second embodiment of an animal feeding dish.

As shown in FIG. 5, the bowl 100 has two interior walls 115 positioned, as shown, with a central post member 120 located within the inner of the two interior walls 115. However, the two interior walls 115 may be irregularly spaced or have another spacing conformity between the two walls. The central post member 120 may be located in different or multiple positions within the bowl 100. Further, the interior walls 115 may comprise undulating surfaces. These surfaces may form peaks 103 and valleys 107 along the length of the interior walls 115. The interior walls 115, as well as the interior surface of the annular sidewall 110, are positioned such that the peaks 103 of one wall substantially align with valleys 107 of the other wall.

This forms pockets 109 whereby food items may reside. In other embodiments, other configurations of the peaks and valleys of the walls may be aligned differently to form different sized or locations of the pockets. The interior walls 115 may be separated by varying distances depending on location (e.g. peaks and valleys). One wall or feature may be at a distance that is the same or greater than or less than a distance between another feature (interior wall, central post member, annular sidewall).

Pockets 109 may be further formed by the separating bars 125 which may be located between the annular sidewall 110 and the outermost interior wall 115, between the interior walls 115, or between the innermost interior wall 115 and the central post member 120. The separating bars 125 may also be repositionable and/or removable to create a custom configuration.

Figure 6:
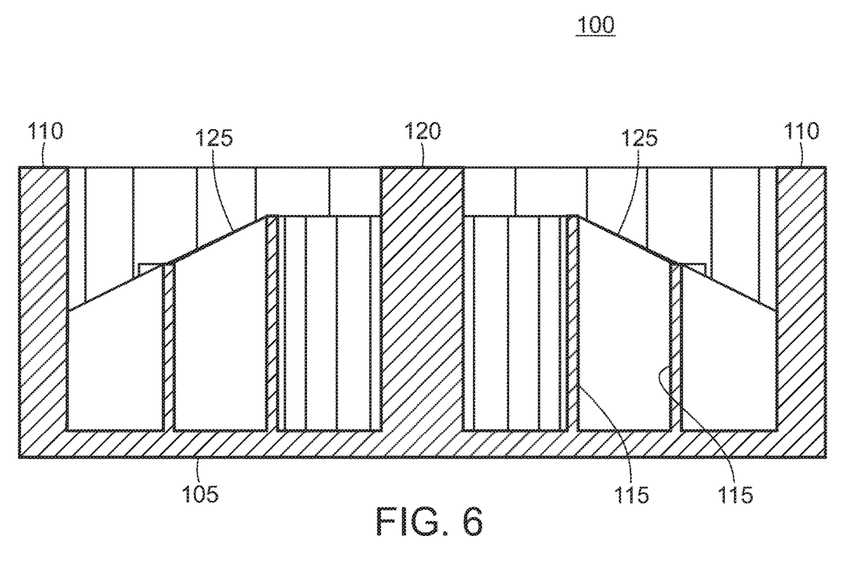
FIG. 6 is a sectional side view of a second embodiment of an animal feeding dish.

Referring now to FIG. 6, the sectional side view demonstrates the height relationships between the structures of the bowl 100. Here, the annular sidewall 110 is higher than at least one, and preferably both, of the two interior walls 115 with the shorter of the walls being the one closest to the annular sidewall 110. The inner bottom wall or space between the two interior walls 115, central post member 120, and annular sidewall 110 may be irregularly textured, patterned, or have random changes in height. All such contribute to the concept of slowing an animal or pet while eating.

The separating bars 125 may be angled to couple the interior walls 115 forming a transition where one side of the bar 125 is about equal in height as one of the interior walls 115 and the other side has a height that is about equal to the other of the interior walls 115. The central post member 120 may be the tallest or highest structure in the bowl 100. The central post member 120 may be no higher than the annular sidewall 110. In other embodiments, the annular sidewall 110 is shorter than the two interior walls 115 which are in turn shorter than the central post member 120. There may be any number of configurations of feature height and are not limited to simply those described herein.

Figure 7:
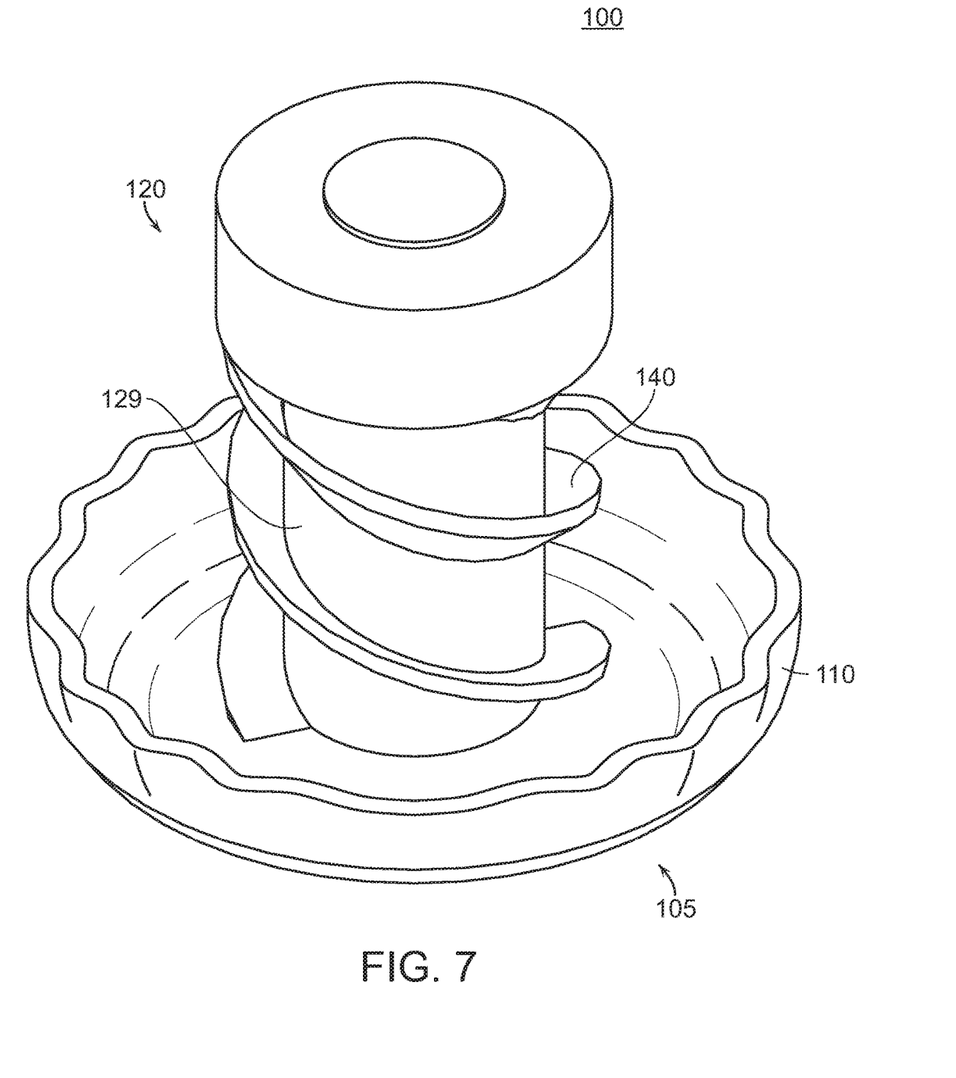
FIG. 7 is a perspective view of a third embodiment of an animal feeding dish.
Figure 8:
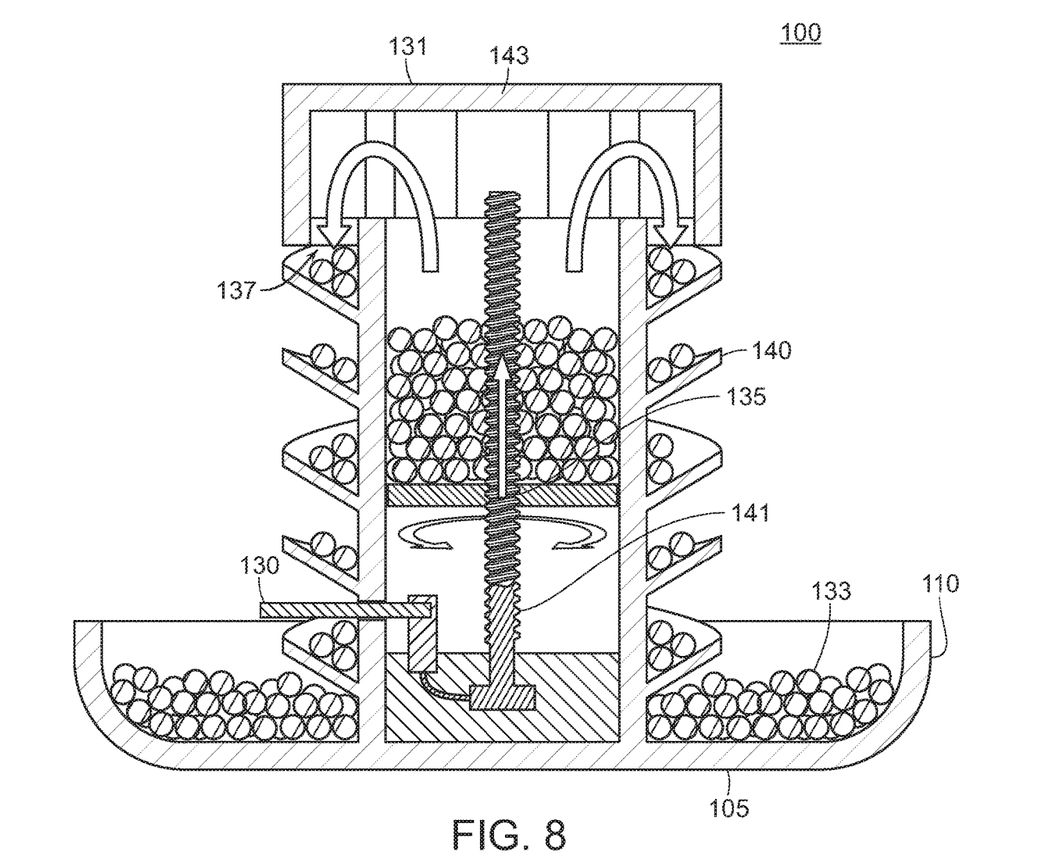
FIG. 8 is a sectional side view of a third embodiment of an animal feeding dish illustrating exemplary internal components and structure of an animal feeding dish.

Referring now to FIGS. 7 and 8, there is a perspective view and a sectional side view of another embodiment of the present invention respectively. In FIG. 7, the bowl 100 has a central post member 120 with channels 140 disposed on an outer surface 129 of the central post member 120. The central post member 120 is coupled to and rises from a base 105 with an annular sidewall 110 surrounding the base 105. The annular sidewall 110 is shown as crimped or undulating, however, virtually any shape may exist.

FIG. 8 illustrates a potential arrangement of the internal mechanisms of the bowl 100 and delivery of the food to the animal in question. Generally shown are the timing mechanism 130, openings 137, channels 140, food delivery mechanism 135, shaft member 141, food item 133, food access point 131, top section 143, base 105, and annular sidewall 110.

In one method of use, a human user can use the food access point 131, preferably a door or hatch, to insert or otherwise place a food item 133 within the central post member 120. The food access point 131 can then be closed and/or secured to prevent any access or spillage of the food item 133. The timing mechanism 130 can then be activated. The timing mechanism 130 may take a variety of forms including but not limited to timed spring mechanisms, electronic programming, and the like. The timing mechanism 130 causes the food delivery mechanism 135 to move upwards through the central post member 120. The food delivery mechanism 135 is preferably sized and shaped to allow smooth motion of the mechanism and to prevent food items 133 from becoming lodged or displaced.

A shaft member 141 may expand, using a cranking or rotating motion, or otherwise exert a force on the food delivery mechanism 135 causing the food delivery mechanism 135 to rise towards the top section 143 of the central post member 120. As the food item 133 reaches the top section 143 it begins to fall or pass through the openings 137 on to the channels 140. The channels 140 provide a mechanism that facilitates the food items travel into the bowl 100. The animal may wait for the food to travel down the channels 140 or may attempt to eat the food item 133 as it is in transit. The timing mechanism 130 is configured to allow a consistent rate of food to be accessible by the animal thereby preventing the animal from overeating or consuming the food item 133 too quickly.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. An animal feeding dish comprising:
   a base;
   an annular sidewall extending upwards from and coupled to the base;
   at least two interior walls,
      wherein the at least two interior walls comprise an undulating vertical surface,
         wherein peaks formed by the undulating vertical surface of one of the at least two interior walls substantially align with valleys of another of the at least two interior walls; and
   wherein the at least two interior walls increase in height along a radius of the animal feeding dish.

2. The animal feeding dish of claim 1 further comprising a central post member.

3. The animal feeding dish of claim 2 wherein the central post member has a height equal to or less than that of the annular sidewall.

4. The animal feeding dish of claim 1 wherein pockets are formed between the aligned peaks and valleys of the at least two interior walls.

5. The animal feeding dish of claim 1 wherein an outer surface of the annular sidewall is substantially flat along a portion of the outer surface and an inner surface of the annular sidewall is undulated.

6. The animal feeding dish of claim 1 wherein the inner surface of the annular sidewall is undulated.

7. An animal feeding dish comprising:
   a base;
   an annular sidewall extending upwards from and coupled to the base; two interior walls,
   wherein the two interior walls each comprise an undulating vertical surface; and a central post member positioned in a central area of the animal feeding dish; and
   wherein the annular sidewall has a height greater than that of the two interior walls and one of the two interior walls has a height that is less than the other interior wall.

8. The animal feeding dish of claim 7 further comprising an antimicrobial coating.

9. The animal feeding dish of claim 7 wherein the central post member is located within an innermost of the two interior walls.

10. The animal feeding dish of claim 7 wherein the animal feeding dish is formed from a continuous piece of material.

* * * * *